(12) United States Patent
Gressus et al.

(10) Patent No.: US 9,718,418 B2
(45) Date of Patent: Aug. 1, 2017

(54) VEHICLE PROVIDING A SECURED ACCESS TO SECURITY DATA

(71) Applicants: Yvon Gressus, Thoiry (FR); Pascal Leroy, Chelles (FR)

(72) Inventors: Yvon Gressus, Thoiry (FR); Pascal Leroy, Chelles (FR)

(73) Assignee: GEMALTO SA, Meudon (FR)

( * ) Notice: Subject to any disclaimer, the term of this patent is extended or adjusted under 35 U.S.C. 154(b) by 168 days.

(21) Appl. No.: 14/345,249

(22) PCT Filed: Sep. 17, 2012

(86) PCT No.: PCT/EP2012/068201
§ 371 (c)(1),
(2) Date: Mar. 16, 2014

(87) PCT Pub. No.: WO2013/037996
PCT Pub. Date: Mar. 21, 2013

(65) Prior Publication Data
US 2014/0350778 A1   Nov. 27, 2014

(30) Foreign Application Priority Data

Sep. 16, 2011   (EP) .................... 11306159

(51) Int. Cl.
*B60R 16/00* (2006.01)
(52) U.S. Cl.
CPC ................... *B60R 16/00* (2013.01)

(58) Field of Classification Search
CPC ..................................... B60R 16/00
See application file for complete search history.

(56) References Cited

U.S. PATENT DOCUMENTS

| | | | |
|---|---|---|---|
| 6,819,986 B2 * | 11/2004 | Hong | B60R 25/2081 340/439 |
| 2006/0157563 A1 * | 7/2006 | Marshall | G06Q 20/341 235/382 |
| 2008/0214022 A1 * | 9/2008 | Kowalick | H01R 13/6397 439/34 |

FOREIGN PATENT DOCUMENTS

GB   WO9313966 A1   7/1993

OTHER PUBLICATIONS

PCT/EP2012/068201 International Search Report, Oct. 18, 2012, European Patent Office, P.B. 5818 Patentlaan 2 NL-2280 HV Rijswijk.

* cited by examiner

*Primary Examiner* — Mussa A Shaawat
*Assistant Examiner* — Michael Kerrigan
(74) *Attorney, Agent, or Firm* — The Jansson Firm; Pehr B. Jansson

(57) ABSTRACT

The invention relates to a vehicle (1) comprising: a multiplexed communication bus (2); an engine control unit (4) connected to the communication bus (2); a secure element (6) hosted in the vehicle and configured to communicate through the communication bus, the secure element securely storing (64) security data related to the vehicle.

14 Claims, 2 Drawing Sheets

VEHICLE PROVIDING A SECURED ACCESS TO SECURITY DATA

BACKGROUND

1. Field of Invention

The present invention generally relates to the automotive, and more particularly to the storage of security data relating to a vehicle, for which a protected access must be provided to prevent forgery.

2. Description of the Related Art

A vehicle stores various data associated to it, either in digital or in analog form. Stored data are for instance the mileage, the distance to the next overhaul, the vehicle serial number, the license plate data, the date and type of vehicle defects, etc. Stored data may either be accessed visually or electronically according to its storage medium. For instance, the mileage is stored in an engine control module (ECM) and is displayed on the dashboard. The date and type of a vehicle defect are also stored in the engine control module. Such data can be read and sometimes modified using specific electronic equipment connected to the engine control module through a dedicated connector.

The engine control module commonly collects data from various devices in the car. Vehicles now include a great number of electronic control units distributed throughout the vehicle, for performing safety, control or comfort functions. Such control units are notably used to manage the transmission, the airbags, the antilock braking/ABS, the cruise control, the electric power steering/EPS, the audio systems, the windows, the doors, the mirror adjustment, etc. Some of these electronic control units form independent subsystems, but communications among others or with the ECM are essential. The ECM may notably edit data to be protected like the mileage based on information provided by other electronic control units. A subsystem may also need to control actuators or receive feedback from sensors.

CAN (for Controller Area Network) is a serial communication technology that supports distributed real-time control and multiplexing for use within road vehicles. CAN is a message based protocol. Nowadays, the majority of the produced vehicles integrate a CAN bus. The CAN standard is notably defined in the ISO 11898 specification.

The access to the security data is either not secure enough to prevent forgery or not possible for an end user without a specific diagnostic tool.

Thus, there is a need for a vehicle overcoming one or more of these drawbacks.

SUMMARY OF THE INVENTION

The invention thus relates to a vehicle comprising:
a multiplexed communication bus;
an engine control unit connected to the communication bus;
a secure element hosted in the vehicle and configured to communicate through the communication bus, the secure element securely storing security data related to the vehicle.

According to another embodiment, the secure element is configured to communicate with the engine control unit to retrieve security data related to the vehicle and store the retrieved security data.

According to a further embodiment, the vehicle further comprises several electronic control units connected to the communication bus, the secure element being configured to communicate with these electronic control units and to securely store data provided by these electronic control units.

According to an embodiment, the communication bus is a Controller Area Network compliant bus.

According to a further embodiment, the vehicle further comprises a device powering battery, the secure equipment comprising a power transformer connected to the device powering battery and powering the electronic circuitry of the secure equipment.

According to further embodiment the secure element includes a wireless communication interface.

According to another embodiment the secure element includes a persistent memory area storing said security data related to the vehicle.

According to an embodiment, the secure element includes a security management module configured to authenticate an entity requesting a read or write access to said persistent memory area.

According to a further embodiment, the persistent memory area and the security management module are embedded in a smartcard chip.

According to another embodiment, the secure element includes a transceiver connected to said communication bus and further includes a communication management module forming a communication bridge between the transceiver and the smartcard chip. In one embodiment, the transceiver is a CAN compliant transceiver.

BRIEF DESCRIPTION OF THE DRAWINGS

The advantage of the present invention will become apparent from the following description of several embodiments with reference to the accompanying drawings, in which.

DETAILED DESCRIPTION

Figure 1:
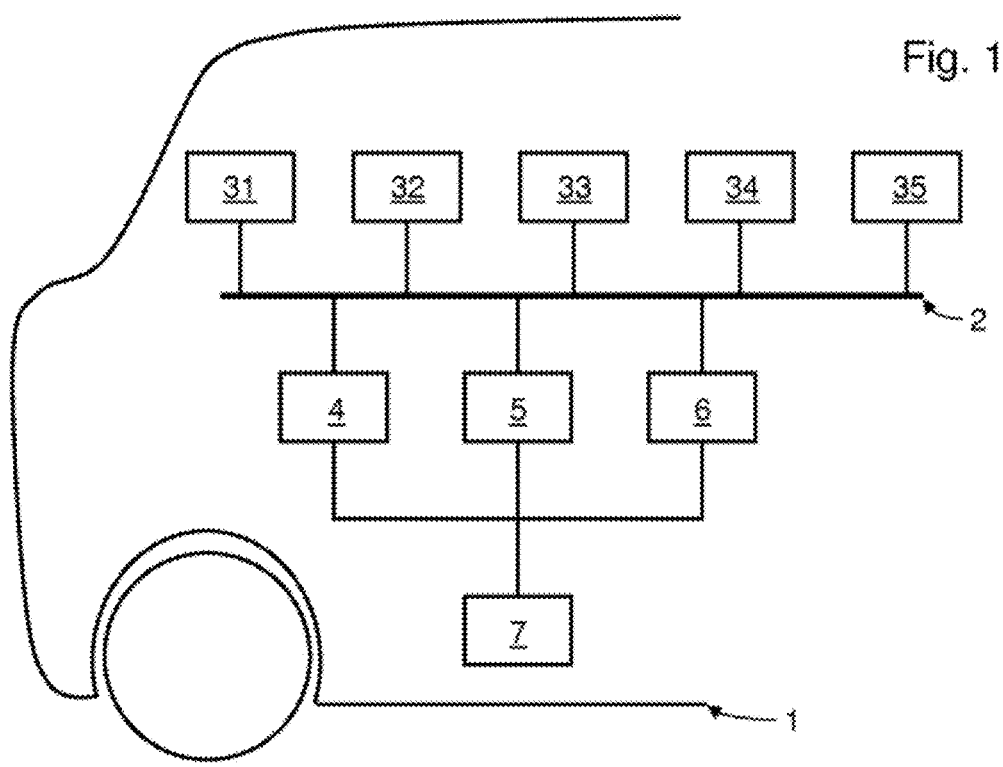
FIG. 1 is a schematic view of an example of vehicle according to the invention.

FIG. 1 is a schematic view of an example of vehicle 1 according to an embodiment of the invention. The vehicle 1 includes a communication bus 2, for instance a CAN bus. Various devices managing the vehicle safety features are connected to the bus 2 and are distributed throughout vehicle 1. The vehicle notably includes an engine 31, a transmission 32, a dashboard 33, a lock system 34 and an anti lock brake system 35. Each of these devices performs functionalities in relation with the vehicle security. For instance, maintaining the engine 31 on when the vehicle 1 is moving is a major safety concern to avoid unwanted accidents. The engine also has to be maintained at regular intervals. The control of the transmission 32 may also be related with safety for vehicles provided with an automatic transmission, for avoiding unwanted engine overspeed when the gear is changed by the user. The dashboard 33 has security features: it shall notably display the exact mileage. The lock system 34 is related with safety, since it may automatically lock the doors once the car is moving or it can unlock all the vehicle doors once the driver actuates a corresponding remote controller. The anti lock brake system 35 obviously relates to safety features since it has to release the braking power when a locked wheel is detected. Further security or safety features, like driver recognition or the like can also be performed by additional devices connected to the CAN bus 2. Major concerns concerning the management performed by these devices are avoiding fraud or guaranteeing reliable safety data.

An engine control module 4, a body control module 5 and a secure module 6 are also connected to the CAN bus 2. These devices 4, 5 and 6 are powered by a device powering battery 7, typically applying a 12V voltage on a vehicle electric network. The engine control module ECM 4 is in charge of managing the electronic control units or sensors of various devices through the CAN bus 2, for instance the engine 31, the transmission 32 or the dashboard 33. The body control module 5 is in charge of managing the electronic control units or sensors of various other devices through the CAN bus 2, for instance the lock system 34 or the various lights of vehicle 1.

A Secure Element usually defines a device including a tamper proof smart card chip capable to embed smart card-grade applications with the required level of security. The Secure Element can be integrated in various form factors: SIM Card or SD Card, M2M form factor or embedded in a larger circuit.

The secure module 6 includes a secure element, for instance a smartcard. The secure element is intended to store various security data and to provide an access to these data if authentication requirements are fulfilled. The secure module 6 may authenticate one or more authorized entities. Stored security data are for instance the mileage, the distance to the next overhaul, the vehicle serial number, the type of the vehicle, the car manufacturer data, the license plate data, the main driver identification, the mileage or date of the last technical control, the date and type of vehicle defects, etc. Stored security data may be duplicates from data stored in other places in the vehicle 1. For instance, the mileage can be redundant information copied from the ECM 4. The license plate data may be stored in a RFID tag embedded in the license plate. The vehicle serial number may be stored in a RFID tag embedded in a carved plate located in the engine compartment.

The secure element may also store safety related data. For instance, parameters in relation to the engine management may be stored in the secure element (for instance injection timings, turbocompressor pressure . . . ) to check if the user has not fraudulently modified these parameters. A fraudulent modification of such parameters may for instance have an incidence on the engine behavior and could lead to an unexpected dysfunction.

The secure element is machine-to-machine (M2M) compliant. The secure element should be removable or not (for instance soldered, depending of the targeted security level M2M refers to technologies that allow a device to communicate with other devices and get specific properties as support a large temperature range from −40° C. up to 125° C. M2M uses a device (such as a sensor or meter) to capture an event (such as temperature, pressure, etc.), which is relayed through a network to an application in another device. The application translates the captured event into meaningful information. According to such functionalities, various devices can act as masters for the secure element.

Figure 2:
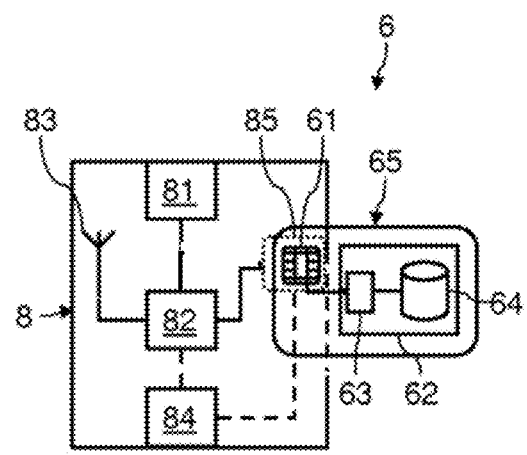
FIG. 2 is a schematic view of a secure element fastened to the vehicle of FIG. 1.

FIG. 2 schematically illustrates a first embodiment of a secure module 6. The secure module 6 includes a smartcard 65 used as a secure element and a smartcard interface translator 8. The smartcard 65 is inserted in a connection slot 85 of the smartcard interface translator 8.

The smartcard 65 includes a chip 62 embedded in a card substrate in a manner known per se. The chip 62 includes a security management module 63 and a persistent data storage area 64. The security management module 63 performs secure applications. The persistent data storage area 64 stores said security data. Such a smartcard 65 is commonly used to perform a user or device authentication. The security management module 63 is therefore configured to perform an authentication before it provides a write/read access to the data stored in area 64. Such a smartcard 65 can have any suitable format, for instance one of the standard UICC formats or QFN (for Quad Flat No, which is a standard non removable format) package for M2M application.

The smartcard interface translator 8 includes a CAN compliant transceiver 81 connected to the CAN bus 2. The smartcard interface translator 8 advantageously includes a wireless communication interface 83. The smartcard interface translator 8 includes a communication management module 82. The communication management module 82 communicates with the smartcard 65 30 through the connection slot 85. The communication management module 82 manages the communication between the transceiver 81 and the smartcard 65, as well as the communication between the wireless interface 83 and the smartcard 65. The communication management module 82 may form a protocol bridge between the smartcard 65 and the communication transceiver 81 as well as the wireless communication interface 83. The smartcard interface translator 8 further includes a power transformer 84. The power transformer 84 is connected to the battery 7 through the electric network of the vehicle 1. The power transformer 84 converts the battery voltage into a lower voltage to power the various circuits of the smartcard interface translator 8 and the smartcard 6.

Due to the presence of the communication management module 82, a standard smartcard 65 may be used, to obtain a very cost efficient solution. The smartcard 65 may communicate with the communication management module 82 using a suitable protocol and a suitable interface, for instance according to the SWP standard.

The wireless communication interface 83 may be compliant with various standards, to communicate for instance through mobile phone communication networks or to communicate according to NFC protocols or according to further protocols like the Bluetooth or IEEE 802.15 compliant protocol.

The wireless communication interface 83 may be used to have the secure module 6 communicate with other devices that do not have an access to the CAN bus 2. Such devices could notably be a global positioning system, a smart mobile phone, a license plate provided with a RFID tag or a carved plate provided with a RFID tag and displaying a vehicle serial number. The secure module 6 can thereby retrieve data from such devices and store these data in the storage area 64. Different kind of users can also access the secure module 6 through the wireless communication interface 83, without any CAN specific communication device. A end user can thereby access the secure module 6 to consult the next occurrence of an overhaul or of a technical control. Authorities can thereby check whether the license plate or the carved plate has been forged by comparing their data with the data stored in the storage area 64. The secure module 6 may also detect and authenticate a driving license provided with a RFID tag. The authenticated driving license may be related with vehicle driving permissions for instance a dedicated speed limit. The ECM 4 may access the secure module 6 to determine which speed limit it may have to apply when controlling the engine 31.

The secure module 6 may behave as a slave device when another device intends to access its content or may behave as a master device when it retrieves data from another device.

The interface adaptor 8 may be fastened to the vehicle frame at a well hidden location to make the access to it difficult for a fraudulent user. The adaptor 8 may be sealed to the vehicle frame for instance. The adaptor may be hosted between the vehicle front seats and may be accessed through a dedicated trap. Fraudulent change or removal attempt of the adaptor shall be difficult, long and if possible easily detectable if a non compliant tool was used for such an attempt. The secure module 6 is designed to match the automotive constraints, for instance working temperatures, life cycle or working capacity in a dusty or wet environment.

Figure 3:
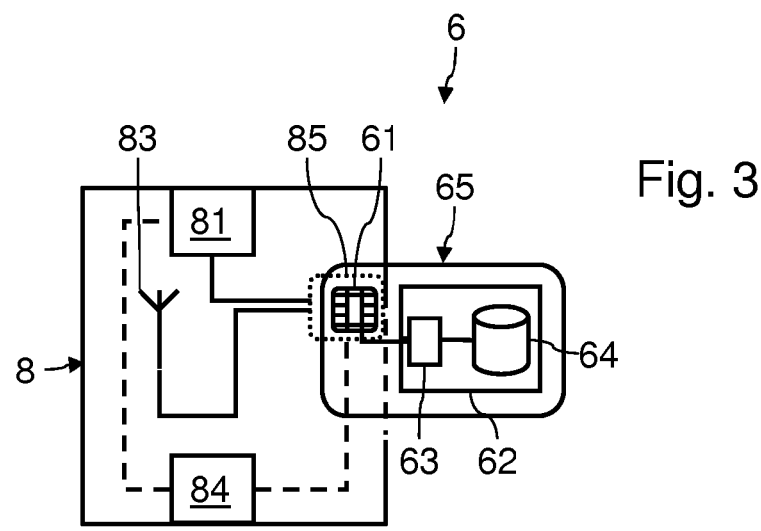
FIG. 3 is a schematic view of another embodiment of a secure element.

FIG. 3 schematically illustrates a second embodiment of the secure module 6. This embodiment differs from the first one in that the smartcard interface translator 8 is deprived of the communication management module 82 and in that the smartcard 65 is configured to manage the transceiver 81 as well as the wireless communication interface 83 on its own.

In this embodiment, a specific chip 62 is used. The specific chip 62 is connected to the CAN transceiver 81 through connector 85. The specific chip 62 provides two input/output interfaces connected to said CAN transceiver 81.

Figure 4:
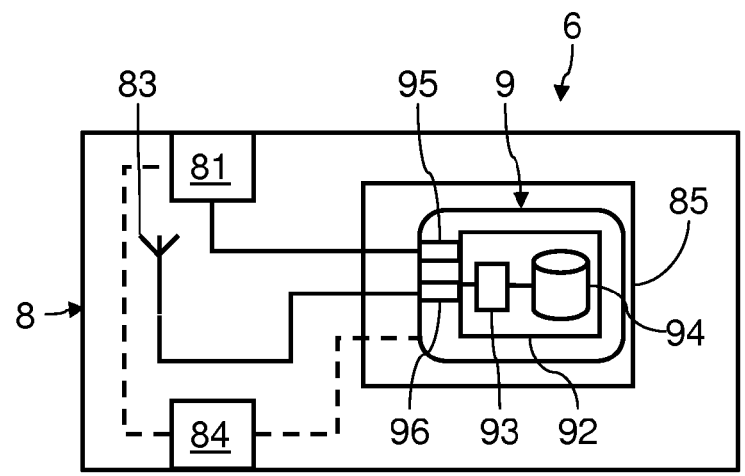
FIG. 4 is a schematic view of another embodiment of a secure element.

FIG. 4 schematically illustrates a third embodiment of the secure module 6. The secure module 6 includes a microcontroller 9 (for instance at the QNF format) used as a secure element and an interface translator 8. The microcontroller 9 is soldered in a connection slot 85 of the interface translator 8. The microcontroller 9 includes for instance pads belonging to a first communication interface 95 and pads belonging to a second communication interface 96. These pads are soldered to the connection slot 85.

The microcontroller 9 includes a chip 92 in a manner known per se. The chip 92 includes a security management module 93 and a persistent data storage area 94. The security management module 93 and the persistent data storage area 94 may be identical to the security management module 63 and the persistent data storage area 64.

The interface translator 8 includes a CAN compliant transceiver 81 connected to the CAN bus 2. The interface translator 83 advantageously includes a wireless communication interface 83. The microcontroller 9 is configured to manage the transceiver 81 as well as the wireless communication interface 83 on its own. The interface translator 8 further includes a power transformer 84. The power transformer 84 is connected to the battery 7 through the electric network of the vehicle 1.

The secure module 6 may behave as a slave device when another device intends to access its content or may behave as a master device when it retrieves data from another device. The interface adaptor 8 may be fastened to the vehicle frame at a well hidden location to make the access to it difficult for a fraudulent user.

Though the disclosed embodiments both include a smartcard removably inserted in a connection slot, the invention also applies to a secure element where the security management circuit is soldered to the remainder of the secure element circuit.

Though the embodiment was disclosed in reference to a CAN bus, other types of multiplexed communication buses may be used to perform the invention, like the bus known under the name Flexray.

The invention claimed is:

1. A vehicle, comprising:
   a multiplexed communication bus;
   an engine control unit connected to the communication bus;
   a secure module including:
      a first communication interface connected to the communication bus;
      a second communication interface for communication with entities and devices not connected on the communication bus;
      a smartcard configured to communicate with devices connected to the communication bus via the first communication interface and to communicate with entities and devices not connected to the communication bus through the second communication interface, the smartcard securely storing security data related to the vehicle, said smartcard including:
         a persistent memory area storing said security data related to the vehicle and
         a security management module configured to authenticate an entity or device requesting read or write access to said persistent memory area and to provide read or write access to the entity upon successful authentication of the entity or device.

2. The vehicle according to claim 1, wherein the entity or device requesting read or write access is the engine control unit and the smartcard is configured to retrieve security data related to the vehicle from the engine control unit and is configured to store the retrieved security data in the persistent memory area.

3. The vehicle according to claim 1, further comprising several electronic control units connected to the communication bus, the smartcard being configured to communicate with these electronic control units, to authenticate these electronic control units, and upon authentication of these electronic control units, to securely store data provided by these electronic control units.

4. The vehicle according to claim 1, wherein the communication bus is a Controller Area Network compliant bus.

5. The vehicle according to claim 1, further comprising a vehicle device powering battery, the secure module further comprising a power transformer connected to the device powering battery and powering the electronic circuitry of the secure module.

6. The vehicle according to claim 1, wherein the second communication interface is a wireless communication interface.

7. The vehicle according to claim 1, wherein the secure module includes a transceiver connected to said communication bus and further includes a communication management module forming a communication bridge between the transceiver and the smartcard.

8. The vehicle according to claim 1, wherein the transceiver is a CAN compliant transceiver.

9. The vehicle according to claim 1, wherein the entity or device is a device not connected to the communication bus selected from the group having the members global positioning system device, smart mobile phone, license plate provided with a RFID tag, a carved plate provided with a RFID tag and displaying a vehicle serial number, and a driving license.

10. The vehicle according to claim 1, wherein the entity or device is a device associated with an end user, the secure module is further configured to configure vehicle driving permissions associated with the end user, and the engine control unit operable to access the driving permissions associated with the end user to control the engine.

11. The vehicle according to claim 1, wherein the smartcard stores a security data associated with the vehicle into the persistent memory area.

12. The vehicle according to claim 11, wherein the security data is selected from the group having the members vehicle mileage, distance to next overhaul, vehicle serial number, type of vehicle, car manufacturing data, license plate data, main driver identification, vehicle mileage at last technical control, date of last technical control, date and type of vehicle defects.

13. The vehicle according to claim 1, wherein the smartcard duplicates data stored in other devices of the vehicle into the persistent memory area.

14. The vehicle according to claim 13, wherein the smartcard stores engine management parameters in the persistent memory area.

* * * * *